INVENTORS
EELTJE DE BOER
JOHAN C. BOLDER
BY
Frank R. Trifari
AGENT

INVENTORS
EELTJE DE BOER
JOHAN C. BOLDER
BY
Frank R. Trifari
AGENT

INVENTORS
EELTJE DE BOER
JOHAN C. BOLDER
BY
Frank R. Trifari
AGENT 3,490,045
PULSE MODULATION TRANSMISSION SYSTEM WITH REDUCED QUANTIZING NOISE DURING ABRUPT INPUT LEVEL TRANSITIONS Eeltje de Boer and Johan Cornelis Balder, Emmasingel, Eindhoven, Netherlands, assignors, by mesne assignments, to U.S. Philips Corporation, New York, N.Y., a corporation of Delaware Filed Aug. 31, 1966, Ser. No. 576,275
Claims priority, application Netherlands, Sept. 21, 1965, 6512257
Int. Cl. H04b *1/66*
U.S. Cl. 325—38 10 Claims

ABSTRACT OF THE DISCLOSURE

A bandwidth reduction apparatus for a delta modulation system, particularly one for transmitting video information. An isopolarity discriminator is coupled between the output of the transmitter and the subtractor of a delta modulator. The discriminator is responsive to sequential occurrences of pulses of the same polarity and includes circuits of selected time constants and a threshold device to that a correction signal is applied to the subtractor whenever a sudden change in the video signal occurs. The receiver has a complementary apparatus for receiving the transmitted signal.

The invention relates to a transmission system and to the associated transmitters and receivers for signal transmission by pulse-code modulation, the transmitter comprising a pulse-code modulator connected to a pulse generator, the output pulses of said modulator being transmitted to the associated receiver and, in addition, to a comparison circuit including a local receiver having an integrating network for producing a comparison signal, which is applied, together with the signal to be transmitted to the pulse-code modulator in order to obtain a difference signal which controls the pulse-code modulator, particularly for the transmission of images, for example facsimile, television signals and the like.

The pulse-code modulation of this kind is known as delta modulation and the use thereof for television signals is described in the prior Dutch patent specification 109,-514 (PH 17094) of the applicant.

In pulse-code modulation in general and hence also in delta modulation the amplitude quantisation noise gives rise to deviations between the signal reproduced at the receiver end and the initial signal, which deviations produce the so-called quantisation noise which adversely affects the quality of the reproduced image signal. The deviations between the reproduced signal and the initial signal decrease—and hence the accuracy of the reproduction increases—when the pulse frequency is raised and for the high-quality signal transmission very high pulse frequencies and hence large bandwidths are therefore required. In the delta modulation system described in Dutch patent specification 109,514 (PH 17094) the transmission of a television signal of 5 mc./s. was carried out by a pulse frequency of 100 mc./s., which corresponds to a bandwidth of slightly more than 50 mc./s. required for the transmission.

The invention has for its object to provide a transmission system and the associated transmitter and receivers of the kind set forth, in which apart from a surprisingly simple construction and the same reproduction quality, a considerable reduction of the pulse frequency is obtained; for example, with a pulse frequency of 25 mc./s. a very good reproduction quality is still obtained for a television signal is a bandwidth of 5 mc./s.

The transmission system according to the invention is characterized in that in the associated receiver and in the local receiver the pulses emitted by the pulse-code modulator are applied not only to an integrating network but also to a correction circuit including an isopolarity discriminator which introduces a correction voltage into the comparison circuit at the sequential appearance of pulses of equal polarity.

The invention and its advantages will now be described more fully with reference to the figures.

Figures 1, 2:
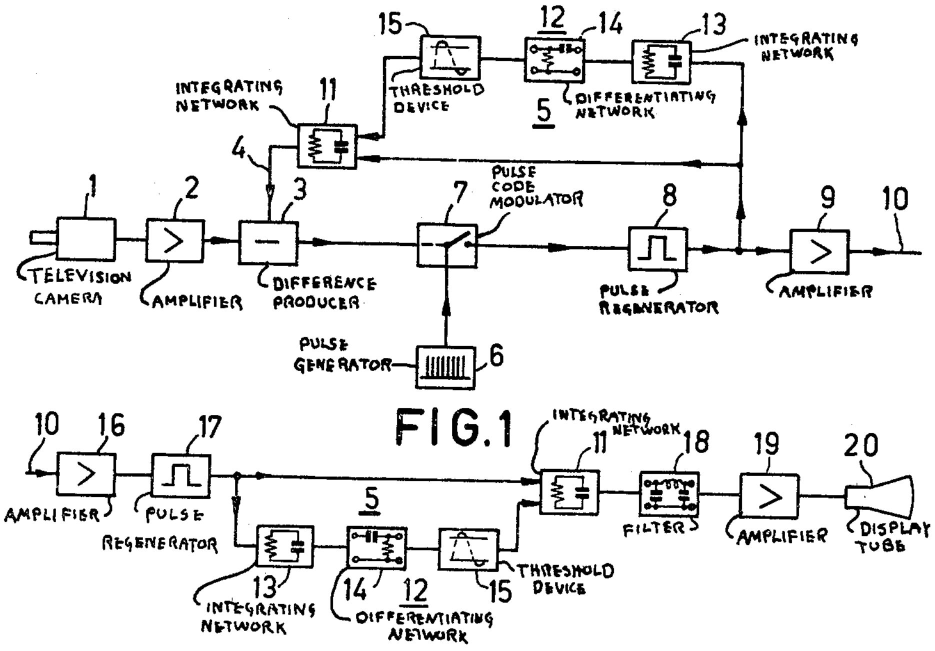

FIGS. 1 and 2 show block diagrams of a transmitter and a receiver respectively of a transmission system according to the invention.

FIGS. 3*a* and 3*b* and 4*a* through 4*e* show a few time diagrams for explaining the devices shown in FIGS. 1 and 2 and FIGS. 5 and 6 show details of a transmitter and a receiver according to the invention.

The transmitting device shown in FIG. 1 for pulse code modulation according to the invention is adapted to transmit television signals with a bandwidth of, for example, 5 mc./s. in which the television signals from a television camera 1 are applied through a video amplifier 2 for further processing in the transmitting device to a difference producer 3.

Through a conductor 4 the difference producer 3 receives furthermore a comparison signal from a comparison circuit including a local receiver 5 in order to obtain a difference signal which controls a pulse-code modulator 7, connected to a pulse generator 6. The pulse generator 6 supplies equidistant pulses of a repetition frequency which is higher than the maximum frequency of the video signal.

In accordance with the polarity of the output signal of the difference producer 3 the pulses from the pulse generator 6 appear with positive or negative polarity at the output of the pulse-code modulator 7. These pulses are applied to a pulse regenerator 8 for suppressing the variations of amplitude, duration, waveform or instant of appearance in the pulse-code modulator 7. The regenerated pulses are transmitted, subsequent to amplification in an amplifier 9, through a conductor 10 to the associated receiver and, in addition, to the local receiver 5, including an integrating network 11 which supplies the comparison signal applied to the difference producer 3. The time constant of the integrating network 11 may be 0.1 μsec.

The circuitry described above tends to reduce the difference signal to zero, so that the comparison signal derived from the local receiver 5 forms a quantised approximation of the television signal to be transmitted. If a difference signal of positive polarity appears, a negative pulse will be applied through the pulse-code modulator 7 to the integrating network 11, which counteracts the positive difference signal, whereas, if the difference signal is negative, the pulse-code modulator 7 supplies a positive pulse to the integrating network 11, which counteracts the negative difference signal. In this way the pulse-code modulator 7 produces a pulse train of positive and negative pulses, the alternation of which is characteristic of the signal to be transmitted.

In the described mode of pulse-code modulation it appears that, particularly for image transmission, for example in television, the obtainment of a good reproduction quality requires a very high pulse frequency with respect to the maximum signal frequency; for example, with a bandwidth of the video signal of 5 mc./s., a pulse frequency of 100 mc./s. appears to be necessary. The applicant's have found that the necessity of using this very high pulse frequency, about 20 times the maximum signal frequency, for obtaining a good reproduction quality, has to be ascribed to the characteristic feature of a television signal, i.e. the occurrence of abrubt level jumps. Examples thereof are the transitions from the black level to the grey level or the converse, which will be explained more fully hereinafter with reference to the time diagrams of FIG. 3.

Figures 3A, 3B:
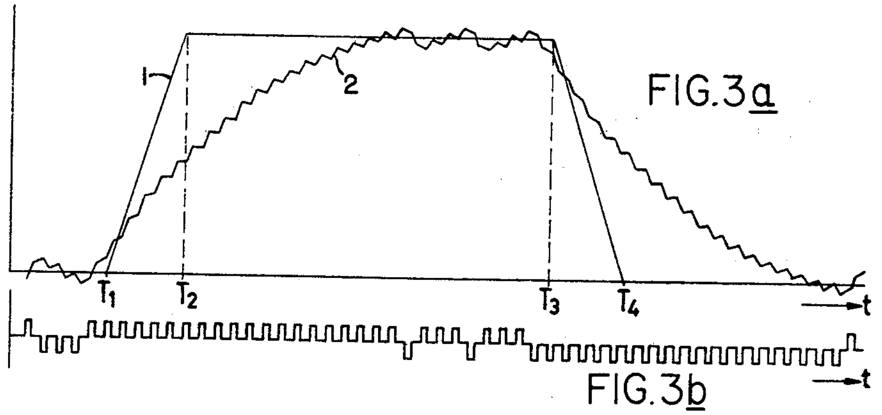

In FIG. 3*a*, the waveform 1 illustrates an image element of a television signal, where the black level abruptly changes over to a grey level in the period from an instant $T_1$ to an instant $T_2$, the grey level being maintained until the instant $T_3$, after which the grey level leaps back to the black level, which is attained at the instant $T_4$. The level jumps of FIG. 3*a* during the periods of time from $T_1$–$T_2$ and $T_3$ to $T_4$ occur in a television signal within a period of time of the order of 0.2 μsec.

In FIG. 3*a* the waveform 2 illustrates the signal at the output of the integrating network 11 at a comparatively low pulse frequency of 25 mc./s. During the black-grey transition at the instant $T_1$ a sequence of consecutive positive pulses will be emitted until the signal at the integrating network 11 has attained the grey level concerned and during the grey level a mixed sequence of positive and negative pulses is produced and during the grey-black transition at the instant $T_3$ a sequence of consecutive negative pulses is emitted until the signal at the integrating network 11 has reached the black level.

FIG. 3*b* illustrates for the sake of clarity the emitted pulse pattern in a time diagram.

From the signal illustrated by the waveform 2 of FIG 3*a* and appearing at the integrating network 11 it will be apparent that during the abrupt level jumps in the periods of time from $T_1$ to $T_2$ and from $T_3$ to $T_4$ serious distortions are involved at this comparatively low pulse frequency of 25 mc./s. The fine variations beyond the abrupt level jumps are found to be followed by the signal of the integrating network 11 with adequate accuracy.

According to the invention an accurate reproduction of the television signal at the comparatively low pulse frequency of, for example, 25 mc./s. is obtained by supplying, in the local receiver 5, the pulses emitted by the pulse-code modulator 7 not only to the integrating network 11 but also, in parallel, to the correction circuit including an isopolarity discriminator 12, which introduces a correction signal into the comparison circuit at the sequential appearances of pulses of the same polarity. In the embodiment shown the isopolarity discriminator 12 is formed by an integrating network 13, having a lower time constant than the first integrating network 11, and a further differentiating network 14 and a threshold device 15, which allows to pass only the part of the output signal of the differentiating network 14 exceeding the threshold value and which supplies this part as a correction voltage to the input of the integrating network 11. The time constant of the differentiating network 14 is at the most equal to a period of a higher signal frequency; it may be 0.02 μsec., whereas the threshold value is chosen to be higher than the signal of the differentiating network 14, which is produced at the mixed appearance of positive- and negative-going pulses.

The operation of the arrangement described will now be explained more fully with reference to the time diagrams of FIG. 4.

Figure 4A:
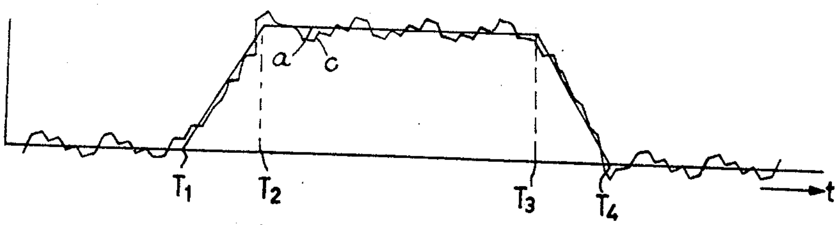

The explanation is again based on the image element illustrated in FIG. 3*a* by the curve *a*; this image element is illustrated in FIG. 4*a* by the curve *a*; the curve *c* of FIG. 4*a* illustrates the signal at the integrating network 11, which is representative of the reproduced signal. The curves of FIGS. 4*b*, 4*c* and 4*d* represent, in order of succession, the signals at the integrating network 13, at the differentiating network 14 and the correction signal supplied through the threshold device 15 to the integrating network 11 and FIG. 4*e* illustrates the emitted pulse pattern.

When the image element illustrated by the curve *a* of FIG. 4*a* is supplied to the difference producer 3, a sequence of consecutive positive pulses will be produced at the black-grey transition at the instant $T_1$, as indicated in FIG. 3*b*, and supplied to the integrating network 11 and, moreover, to the integrating network 13 of the isopolarity discriminator 12. Due to its considerably lower time constant the integrating network 13 will have an output signal which rises considerably more rapidly than the output signal of the integrating network 11.

Figure 4B:
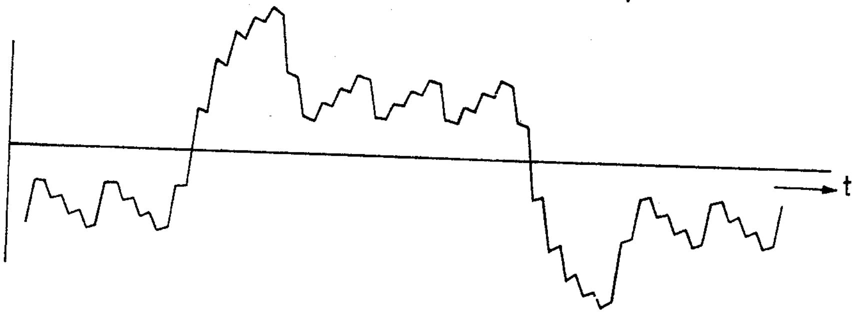
Figure 4C:
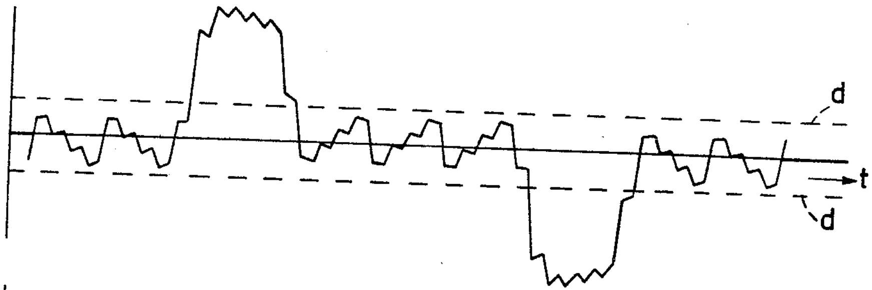
Figure 4D:
Figure 4E:
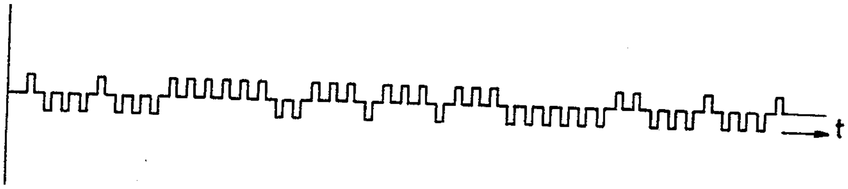

FIG. 4*b* shows the output signal of the integrating network 13 and FIG. 4*c* shows the output signal of the differentiating network 14; that part of said signal which exceeds the threshold value of the threshold device 15 is supplied as a correction signal to the integrating network 11. FIG. 4*c* indicates the level of the threshold device 15 by the two lines *d* and for the sake of clarity FIG. 4*d* shows the correction signal produced at the black-grey transition.

At the occurrence of an abrupt black-grey jump the integrating network 11 is charged very rapidly by the correction signal, which has a considerably greater charge than the code pulses applied to the integrating network 11; the charging time of the integrating network 11 during the transition from the black level to the grey level may be reduced by a factor 20. Therefore the output signal of the integrating network 11, which is representative of the reproduced signal, is brought from the black level to the grey level within a few pulse periods, in this embodiment within four pulse periods, which corresponds to a period of time of 0.16 μsec.

When the grey level is attained, the mixed appearance of positive and negative pulses will cause the output signal of the integrating network 11 to oscillate around this grey level, which is illustrated by the curve *c* in FIG. 4*a*. In the integrating network 13 of the isopolarity discriminator 12 the mixed appearance of positive and negative pulses at a grey level results in the signal illustrated in FIG. 4*b*, which oscillates around a given, constant level; the differentiation in the differentiating network 14 of this signal provides the signal illustrated in FIG. 4*c*. Owing to the low time constant of the differentiating network 14 the signal illustrated in FIG. 4*d* will drop within a short period of time below the threshold level *d* of the threshold device 15, so that the isopolarity discriminator 12 does not supply a correction signal to the integrating network 11. When the grey level is attained, the isopolarity discriminator 12 is automatically put out of operation and the code pulses directly applied to the integrating network 11 follow the grey level and any fine level variations.

If the grey-black transition indicated in FIG 4*a* occurs at the instant $T_3$, the isopolarity discriminator 12 will produce a negative-going correction signal as at the instant $T_1$ of the black-grey transition, which signal causes the output signal of the integrating network 11 to move rapidly from the grey level to the black level. FIGS. 4*b*, 4*c* and 4*d* illustrate respectively the signals at the outputs of the integrating network 13, the differentiating network 14 and the threshold device 15.

When the black is reached, as explained above, the mixed appearance of positive and negative pulses will put the isopolarity discriminator 12 out of operation, after which the code pulses directly applied to the integrating network 11 will follow with great accurary the black level and the fine level variations, if any.

In fact, the abrupt level variations are compensated by the steps according to the invention by a discontinuous control-process which may be utilized in delta modulation without the risk of instabilities, since the delta modulation circuit itself tends to reduce the difference signal to zero and hence operates as a negatively feed-back circuit. At the same time the finer level variations beyond the abrupt level jumps are followed with great accuracy.

The effect of the steps according to the invention is remarkable and it will be clearly apparent from the time diagrams of FIGS. 3*a* and 4*a*. From a comparison between FIGS. 3*a* and 4*a* it will be seen by the curves *b* and *c* of these figures that with the reproduction of the image element *a* the great deviations involved in the abrupt level jumps are substantially completely compensated, whilst the fine level variations beyond these abrupt level jumps are accurately followed. The application of the measures according to the invention provided an excellent reproduction quality in the transmission of a television signal of 5 mc./s. with a pulse frequency of not more than 25 mc./s., which corresponds to a transmission bandwidth of about 13 mc./s.

The remarkable effect described above is furthermore illustrated by a comparison with conventional pulse-code modulation (PCM). In the conventional PCM transmission of a television signal of 5 mc./s. with a pulse frequency of 25 mc./s. only three levels are distinguished, which means an extremely poor reproduction quality, which is poorer in every respect to a comparison with the excellent reproduction quality obtained by the system according to the invention. It being considered that, in addition, the system according to the invention has a particularly simple construction and that the adjustment need not fulfil any special requirements, it will be apparent that a practical arrangement for the transmission of television signals is obtained which is particularly attractive.

FIG. 2 shows a block diagram of the receiver associated with the transmitting device shown in FIG. 1. The construction of the receiver shown in FIG. 2 corresponds substantially with that of the local receiver of the transmitter shown in FIG. 1; similar elements are designated by the same reference numerals.

In the receiver shown in FIG. 2 the pulses coming in through a conductor 10 are supplied, subsequent to amplification in the pulse amplifier 16, to a pulse regenerator 17, which regenerates the incoming pulses in amplitude, duration, waveform and instant of occurrence.

To the output circuit of the pulse generator 17 is connected in parallel an integrating network 11, which corresponds with the integrating network 11 of the local receiver 5 of the transmitting device, and an isopolarity discriminator 12, corresponding with the isopolarity discriminator 12 in the local receiver 5 of the transmitting device, formed by the cascade connection of an integrating network 13, a differentiating network 14 and a threshold device 15, the output circuit of which is connected to the integrating network 11. The reproduced signal is obtained at the integrating network 11 and applied through a low bandpass filter 18 and a video amplifier 19 to the television display tube 20, which is shown diagrammatically in FIG. 2.

In the manner described for FIG. 1 with reference to the curves of FIGS. 4*a*, 4*b*, 4*c*, and 4*d* not only abrupt level jumps but also fine level variations are accurately reproduced. While all advantages of pulse-code transmission are maintained, the disadvantages due to the amplitude quantisation are reduced to a great extent. When the measures according to the invention were applied, the noticeable improvement of 26 db in the transmission quality was obtained, so that it was possible to use the very low pulse frequency of 25 mc./s. for the transmission of a television signal of 5 mc./s. bandwith with excellent reproduction quality.

Figure 5:
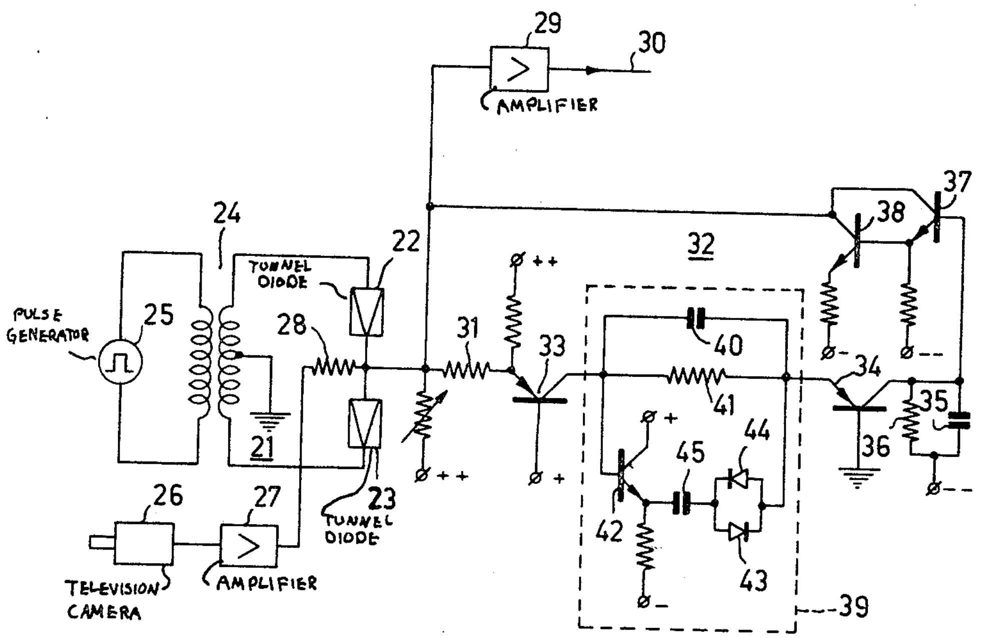

FIG. 5 shows a transmitting device for delta modulation according to the invention in detail.

In the transmission device shown in FIG. 5 according to the invention a pulse-code modulator 21 of the kind described in the prior Dutch patent specification No. 109,514 (PH 17094) is employed. The pulse-code modulator 21 comprises two series-connected dipole elements formed by two tunnel diodes 22, 23, the unlike electrodes of which are connected to each other and, furthermore, a pulse generator 25, which is connected through a transformer 24 to the series combination of the two tunnel diodes 22, 23 and which shifts the adjustment of the two tunnel diodes 22, 23 simultaneously in the direction of their negative resistance values by the pulses of the same amplitude but opposite phases applied thereto.

The junction of the two tunnel diodes 22, 23 has connected to it a television camera 26 through a video amplifier 27 and a series resistor 28, the output pulses being derived from the junction of the two tunnel diodes 22, 23 and applied on the one hand through an amplifier 29 to a transmission conductor 30 and on the other hand through a series resistor 31 to a comparison circuit including a local receiver 32. The local receiver comprises two cascade-connected transistors 33, 34 in common base connection, the collector electrode of the transistor 34 being connected to an integrating network comprising the parallel-combination of a capacitor 35 and a resistor 36 for producing the comparison signal which is applied through transistors 37, 38, operating as current amplifiers, to the junction of the two tunnel diodes 22, 23.

The device described so far operates essentially like the device described in patent specification (PH 17094, Dutch patent specification 109,514). In accordance with the polarity of the difference between the video signal from the video amplifier 27 and the comparison signal from the local receiver 32 the two tunnel diodes 22, 23 will be traversed by an adjusting current, which adjusts the tunnel diode 22 in the pass direction and the tunnel diode 23 in the reverse direction or the tunnel diode 22 in the reverse direction and the tunnel diode 23 in the pass direction. In accordance with the direction of said adjusting current, that is to say depending upon the fact whether the video signal from the video amplifier 27 is higher or lower than the comparison signal, either the tunnel diode 22 will be adjusted to a high resistance value and the tunnel diode 23 to a low resistance value or the tunnel 22 will be adjusted to a low resistance value and the tunnel diode 23 to a high resistance value at the simultaneous supply of a pulse from the pulse generator 25 to the two tunnel diodes 22, 23, which are shifted by said pulse towards the negative resistance characteristics. In accordance with the polarity of the difference between the video signal from the video amplifier 27 and the comparison signal at the junction of the two tunnel diodes 22, 23 a positive-going or a negative-going pulse will appear, which pulse is applied on the one hand through the pulse amplifier 29 to the conductor 30 and on the other hand through the series resistor 31 to the comparison circuit including the local receiver 32.

In order to obtain the noticeable improvement in the reproduction quality of the television signal transmission the device described is provided, in accordance with the invention, with an isopolarity discriminator 39, which is formed here by an integrating network connected between the two transistors and consisting of the parallel-combination of a capacitor 40 and a resistor 41, one end being connected to the base electrode of an emitter follower transistor 42 and the other end of the integrating network 40, 41 being connected through the series-combination of a threshold device formed by two anti-parallel connected diodes 43, 44 and a capacitor 45 to the emitter electrode of the emitter follower 42.

The explanation of the operation of the device described is based on the state in which a comparatively low voltage is produced across the integrating network 40, 41, which means that the same low voltage is operative across the series-combination of the anti-parallel connected diodes 43, 44 and the capacitor 45, since in the emitter-follower transistor 42 the voltage of the emitter electrode follows that of the base electrode. The voltage across the two anti-parallel connected diodes 43, 44 then also has a low value, so that these anti-parallel connected diodes 43, 44 have a very high resistance value and no current will flow through the series combination 43, 44, 45 and the transistor 34 in common base connection to the integrating network 35, 36.

When on the basis of said condition the pulse code modulator 21 produces a sequence of consecutive pulses of given polarity, which sequence, as stated above, is characteristic of the appearance of a level jump, the voltage across the integrating network 40, 41 will increase rapidly and hence also the voltage across the two anti-parallel connected diodes 43, 44, the resistance of which will consequently drop to a very low value. The emitter current of the emitter follower 42 can then flow fully through the transistor 34 to the integrating network 35, 36, the voltage of which will thus follow rapidly the level jump concerned.

When the level concerned is attained, the mixed sequence of positive and negative pulses will cause the voltage across the integrating network 40, 41 to stabilize on a given constant value, apart from the oscillations; as stated above, said voltage is equal to the voltage across the series combination of the capacitor 45 and the two anti-parallel connected diodes 43, 44. In this state the capacitor 45 is rapidly charged to this constant value; the charging rate being determined by the time constant of the capacitor 45 and the still low resistance value of the anti-parallel connected diodes 43, 44, so that the voltage across the two anti-parallel connected diodes 43, 44 drops to a very low value, the resistance value thus increasing to a high extent, the passage of current through the series combination of the capacitor 45 and the anti-parallel connected diodes 43, 44 being interrupted. The capacitor 45 with the anti-parallel connected diodes 43, 44 operates at the low resistance value as a differentiating network for the current passing through said circuit.

When the constant level is reached, the isopolarity discriminator 39 is put out of operation so that the current pulses produced in the pulse-code modulator 21 are supplied through the two transistors 33, 34 in common base connection without being appreciably affected by the network 40, 41 and to the integrating network 35, 36. The mixed sequence of positive and negative pulses produced in the pulse-code modulator 21 causes the voltage of the integrating network 35, 36 to follow accurately the constant level and the fine level variations.

In quite the same manner as described in the foregoing with reference to the time diagrams of FIGS. *4a*, *4b* and *4c*, an excellent reproduction quality of a television signal of a bandwidth of 5 mc./s. is obtained at the low pulse frequency of 25 mc./s. The simplicity of the apparatus in which said noticeable effect is obtained is surprisingly great.

Figure 6:
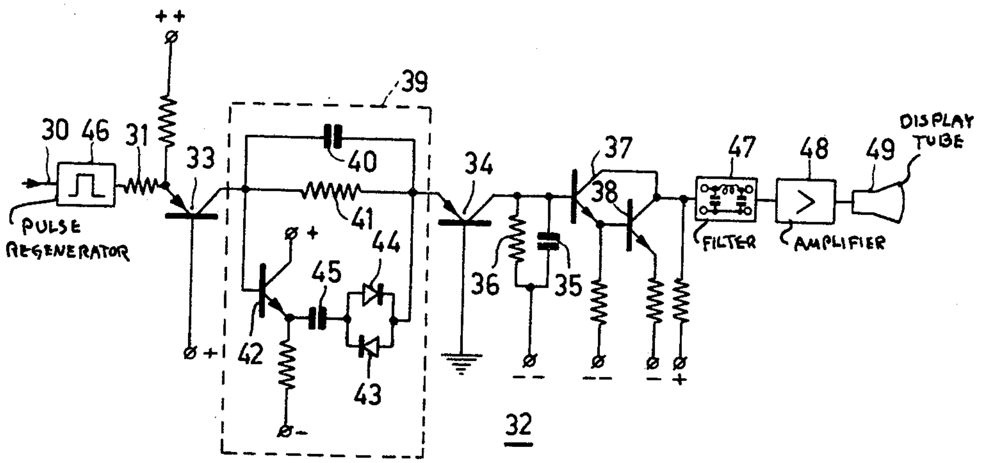

FIG. 6 shows the receiver co-operating with the device of FIG. 5 and constructed similarly to the local receiver 32 in the comparison circuit of the transmitting device. Corresponding elements are designated by the same reference numerals.

In the receiver shown in FIG. 6 the pulses coming in via the conductor 30 are applied to a pulse regenerator 46, which regenerates the incoming pulses with respect to amplitude, duration, waveform and instant of occurring.

The regenerated pulses are applied in the manner described with reference to FIG. 5 through a series resistor 31 to the cascade connection of two transistors 33, 34 in common base connection, whilst the collector circuit of the transistor 34 includes an integrating network formed by a capacitor 35 and a resistor 36; this integrating network 35, 36 is connected to the cascade connection of two transistors 37, 38 operating as current amplifiers. The output signal is supplied through a low bandpass filter 47 to an amplifier 48, which is connected to the television display tube 49.

The isopolarity discriminator 39 comprises, in the manner described with reference to FIG. 5, an integrating network connected between the transistors 33, 34 and formed by the parallel combination of a resistor 41 and a capacitor 40, one end of the integrating network 40, 41 being connected to the base electrode of an emitter follower 42, and the other being connected through the series combination of a capacitor 45 and two anti-parallel connected diodes 43, 44 to the emitter electrode of the emitter follower 42. The operation of this device corresponds fully with that of the local receiver 32 described with reference to FIG. 5, so that further explanation may be dispensed with.

Of a practically tested system the following data are given:

| | | |
|---|---|---|
| Capacitor **35** | μF | 1000 |
| Resistor **36** | Ohms | 3.3K |
| Time constant | μsec | 3.3 |
| Capacitor **45** | μμF | 560 |
| Diodes **43**, **44** | AAZ | 13 |
| Time constant at the low resistance value of diode **43**, **44** | μsec | 0.02 |
| Capacitor **40** | μμF | 56 |
| Resistor **41** | Ohms | 1.8K |
| Time constant | μsec | 0.1 |

Not only for image signal transmission but also for the transmission of other signals in which abrupt level jumps occur, for example music, the system according to the invention may be employed advantageously.

It should finally be noted that owing to the very small bandwidth required the system according to the invention may be successfully used for recording image signals on magnetic tape.

What is claimed is:

1. In a local receiver for a delta modulation system of the type having a source of input signals, a source of cyclic pulses, pulse code modulating means for producing output pulses synchronized with said cyclic pulses and having polarities dependent upon the polarity of signals applied thereto, applying means for applying said output pulses to said local receiver, and subtraction means for applying the difference between the output signals of said local receiver and the instantaneous value of said input signals to said pulse code modulation means, said local receiver comprising integrating means, a first channel for applying said output pulses to said integrating means, the improvement comprising a second channel comprising correction means responsive to the successive occurrence of output pulses of the same polarity for applying a correction signal to the same polarity as said successive pulses to said integrating means, and connecting means for connecting said integrating means to the output of said local receiver.

2. The local receiver of claim 1 in which said second channel comprises isopolarity discriminator means having a time constant substantially less than the time constant of said integrating means.

3. The local receiver of claim 2 in which said isopolarity discriminator means comprises, in the order named, second integrating means for receiving said output pulses, differentiating means coupled to said second integrating means, and threshold means coupled to said differentiating means.

4. In a delta modulation device comprising a transmitter having a source of input signals, a source of cyclic pulses, pulse code modulating means for producing output pulses synchronized with said cyclic pulses and having a polarity dependent upon the polarity of signals applied thereto, a local receiver, subtraction means applying the difference between the output signals of said local receiver and the instantaneous value of said input signals to said pulse code modulating means, and transmitting means for transmitting said output pulses, said local receiver comprising an integrating network, first applying means for applying said output pulses to said integrating network whereby successive said output pulses of opposite polarities are applied in substantially unmodified form to said integrating network, the improvement comprising correction means responsive to the occurrence of successive said output pulses of the same polarity for applying a correction signal to said integrating network, said correction signal having the same polarity as said successive output pulses of the same polarity and deriving means for deriving said output signals of said local receiver from said integrating network.

5. The device of claim 4 comprising a remote receiver for receiving said transmitted output pulses, said remote receiver comprising a second integrating network, first receiver means for applying the received pulses to said second integrating network whereby successive said received pulses of opposite polarities are applied in substantially unmodified form to said second integrating network, second receiver means responsive to the occurrence of successive received pulses of the same polarity for applying a second correction signal to said second integrating means, said second correction signal having the same polarity as said successive received pulses of the same polarity, and output circuit means connected to said second integrating network.

6. The device of claim 4 in which said correction means comprises an isopolarity discriminator, said isopolarity discriminator comprising, in the order named, an integrating circuit having a time constant shorter than the time constant of said integrating network for receiving said output pulses, differentiating means coupled to said integrating circuit, and a threshold circuit coupled to said differentiating means.

7. The device of claim 4 in which said first applying means comprises a parallel circuit of a resistor and capacitor, second applying means applying said output pulses to one end of said parallel circuit, and connecting means connecting the other end of said parallel circuit said integrating network, the time constant of said parallel circuit being shorter than the time constant of said integrating network, and said correction means is connected between said first and second ends of said parallel circuit.

8. The device of claim 7 in which said correction means comprises a transistor connected as an emitter follower and having its base electrode connected to said one end of said parallel circuit and its emitter electrode connected by way of a second resistor to a point of reference potential, a second capacitor having one terminal connected to said emitter electrode, and a pair of diodes connected in parallel with opposite polarity electrodes being interconnected, said parallel connected diodes being connected between the other of said second capacitor and said other end of said parallel circuit, said resistor and second capacitor forming a differentiating network.

9. The device of claim 7 in which the time constant of said parallel circuit is no greater than the period of the highest frequency signals of said input signals.

10. A delta modulation transmission system comprising a transmitter and a remote receiver, said transmitter having a source of input signals, a source of cyclic pulses, pulse code modulating means for producing output pulses synchronized with said cyclic pulses and having a polarity dependent upon the polarity of signals applied thereto, a first local receiver, first applying means applying said output pulses to said first local receiver, subtraction means applying the difference between the output signals of said first local receiver and the instantaneous value of said input signals to said pulse code modulating means, and transmitting means for transmitting said output pulses, said remote receiver comprising receiving means for receiving said transmitted pulses, a second local receiver, second applying means applying said received pulses to said second local receiver, and output circuit means connected to the output of said second local receiver and each of said local receivers comprising respective integrating means, the improvement comprising: in the first local receiver correction means responsive to the occurrence of successive output pulses of the same polarity for applying a correction signal to the integrating means of said first local receiver, said correction signal having the same polarity as said output pulses, and in the second local receiver correction means responsive to the occurrence of successive received pulses of the same polarity for applying a correction signal to the integrating means of said second local receiver.

References Cited

UNITED STATES PATENTS

| | | | |
|---|---|---|---|
| 2,816,267 | 12/1957 | DeJager et al. | 325—38.1 |
| 3,249,870 | 5/1966 | Greefkes | 325—38.1 |

KATHLEEN H. CLAFFY, Primary Examiner

A. B. KIMBALL, Jr., Assistant Examiner

U.S. Cl. X.R.

332—11; 325—141, 321